United States Patent [19]

Kokeguchi

[11] Patent Number: 4,963,412
[45] Date of Patent: Oct. 16, 1990

[54] SHEET MATERIAL FOR VEHICLE SAFETY AIR BAGS

[75] Inventor: Akira Kokeguchi, Shiga, Japan

[73] Assignee: Takata Corporation, Tokyo, Japan

[21] Appl. No.: 365,689

[22] Filed: Jun. 14, 1989

[30] Foreign Application Priority Data

Jun. 17, 1988 [JP] Japan .................................. 63-148072

[51] Int. Cl.⁵ ........................ B32B 3/10; B60R 21/16
[52] U.S. Cl. .................................... 428/137; 428/138; 428/139; 428/140; 428/423.7; 428/198; 280/743
[58] Field of Search ............... 428/137, 138, 139, 140, 428/423.7, 198; 280/743

[56] References Cited

U.S. PATENT DOCUMENTS

| | | | |
|---|---|---|---|
| 665,931 | 1/1901 | Pratt | 428/140 |
| 2,264,190 | 11/1941 | Sherts et al. | 428/140 X |
| 3,842,583 | 10/1974 | Gage | 280/743 X |
| 3,892,425 | 7/1975 | Sakairi et al. | 280/743 |
| 4,165,403 | 8/1979 | Alban | 428/140 |
| 4,229,473 | 10/1980 | Elber | 428/140 X |
| 4,587,175 | 5/1986 | Akao | 428/134 X |

*Primary Examiner*—Ellis P. Robinson
*Assistant Examiner*—William P. Watkins, III
*Attorney, Agent, or Firm*—Brumbaugh, Graves, Donohue & Raymond

[57] ABSTRACT

Sheet material for use in vehicle safety air bags comprises a multiplicity of perforated films of polymeric material having holes, the perforated films being superposed on each other such that the holes in adjacent films do not overlap to any great extent, and adhesive filling the holes of all of the perforated films other than the outermost ones and uniting them into a laminate.

9 Claims, 13 Drawing Sheets

SHEET MATERIAL FOR VEHICLE SAFETY AIR BAGS

FIELD OF THE INVENTION

The present invention relates to sheet material for vehicle safety air bags and, in particular, to sheet material composed of several perforated polymeric films joined by an adhesive to form a laminate.

BACKGROUND OF THE INVENTION

Air bags are increasingly being installed in motor vehicles and have proven to reduce greatly the risk of injury and death to the protected vehicle occupants. The technology of air bags has been the subject of extensive research over many years. One aspect of that research has involved the material of the air bag.

The air bags in current use are usually made of a coated woven fabric. The fabric provides the strength required to endure the large forces exerted on the material upon inflation and upon impact by the vehicle occupant. The coating is present to seal the fabric against gas leakage. The manufacture of the air bag involves sewing two pieces of the fabric material together and also sewing reinforcement and inflation control elements onto the basic bag or envelope.

Coated fabric air bags have three disadvantages. One is that the coated fabric is relatively thick, usually about 400 micrometers. Accordingly, the enclosure in the vehicle into which the air bag is folded in readiness for deployment is of a relatively large size. A second disadvantage is the complexity of the manufacturing process, which makes the air bag expensive to make. A third disadvantage is that the air bag is opaque, so the driver cannot see ahead when the bag is deployed.

An obvious candidate for the bag material, of course, is a polymeric film. Thermoplastic polymeric films can be vacuum-formed to give the air bag a desired shape and can be fusion-bonded, which is a more economical manufacturing technique than sewing. Many suitable polymeric films are transparent, so the driver's view ahead would be preserved. Thus, a polymeric film air bag would overcome the above-mentioned disadvantages.

Many polymeric films, especially uniaxially and biaxially stretched films, have sufficient tensile and rupture strengths for air bags, but they do not have adequate notch tear strength (resistance to tearing at a notch). On the other hand, polymeric films, especially stretched polymeric films, have good edge tear strength (resistance to tearing at an edge with no notch). Because of an insufficient notch tear strength, ordinary polymeric films (unstretched or stretched) are not satisfactory for air bags.

SUMMARY OF THE INVENTION

An object of the present invention is to provide an air bag material that can be produced efficiently and economically, has excellent mechanical properties, is thin and occupies less volume when folded and is transparent.

There is provided, according to the present invention, sheet material for use in vehicle safety air bags comprising a multiplicity of perforated films of polymeric material having holes, the perforated films being superposed on each other such that the holes in adjacent films do not substantially overlap, and adhesive filling the holes of all of the perforated films other than the outermost ones and uniting them into a laminate.

In preferred embodiments, sheet material according to the invention may include a non-perforated film adhered to an outermost perforated film and an adhesive filling the perforations of the outermost film to unite it to the laminate. The perforated films have curved edges throughout free of corners. The maximum dimension of the holes in any direction is preferably about 20 mm, and the minimum dimension of the holes in any direction is about 5 mm. The total area of the holes in each perforated film should not exceed about 50% of the total area of the film and is desirably from about 25% to about 45% of the total area of the film. The sheet material may have a total thickness of up to about 300 micrometers, say in the range of from about 250 micrometers to about 300 micrometers.

For a better understanding of the invention, reference may be made to the following description of exemplary embodiments, taken in conjunction with the accompanying drawings.

Figure 12:
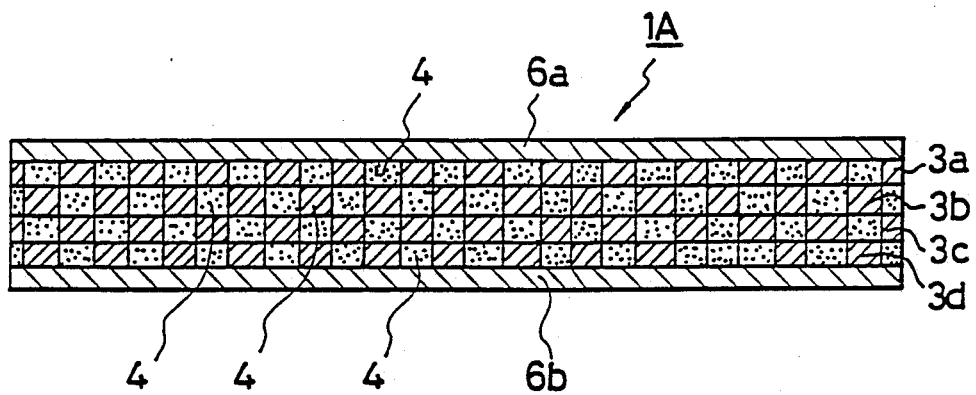
Figure 13:
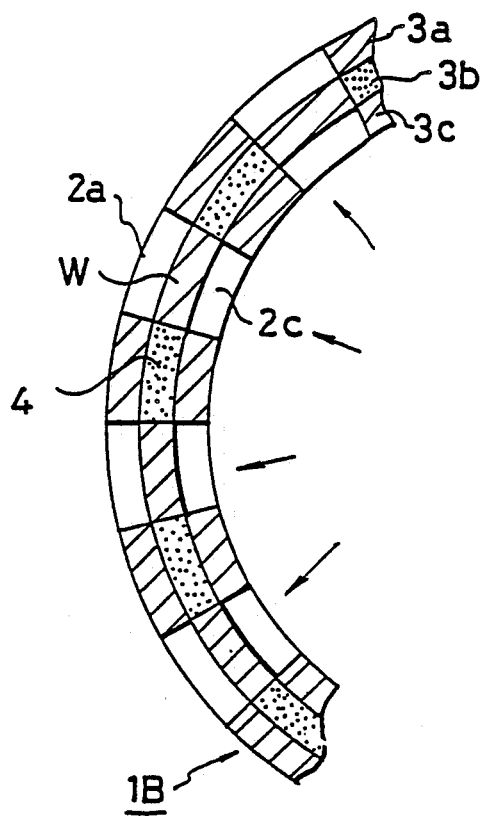
Figures 14, 15:
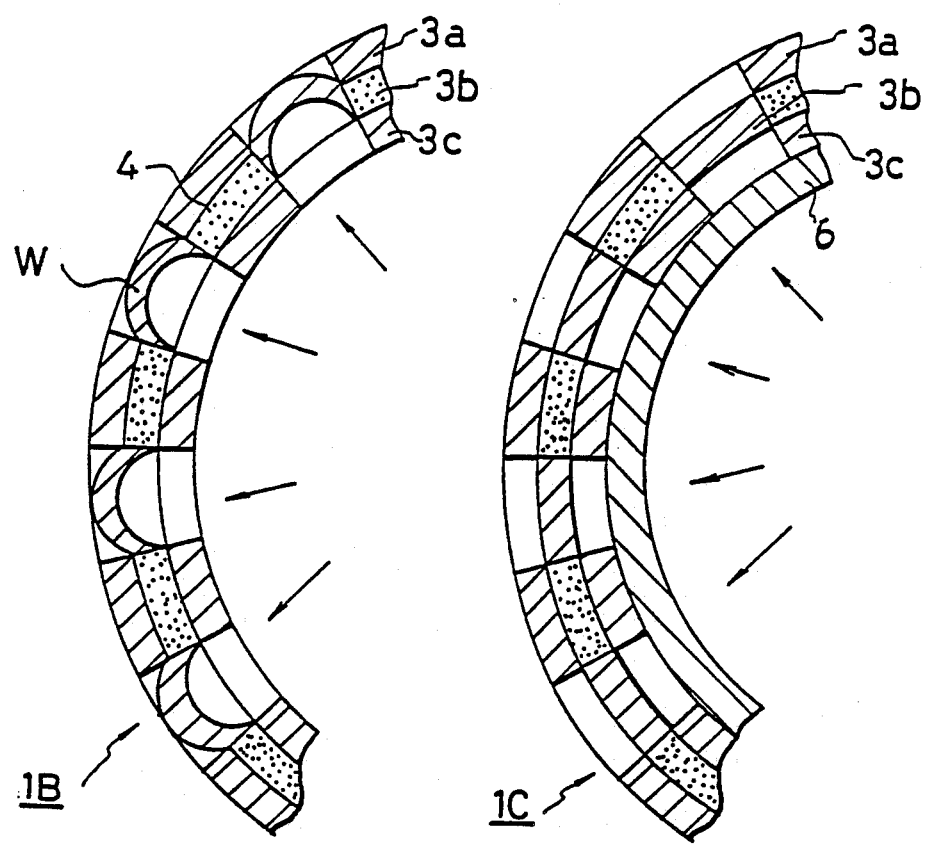
Figure 16:
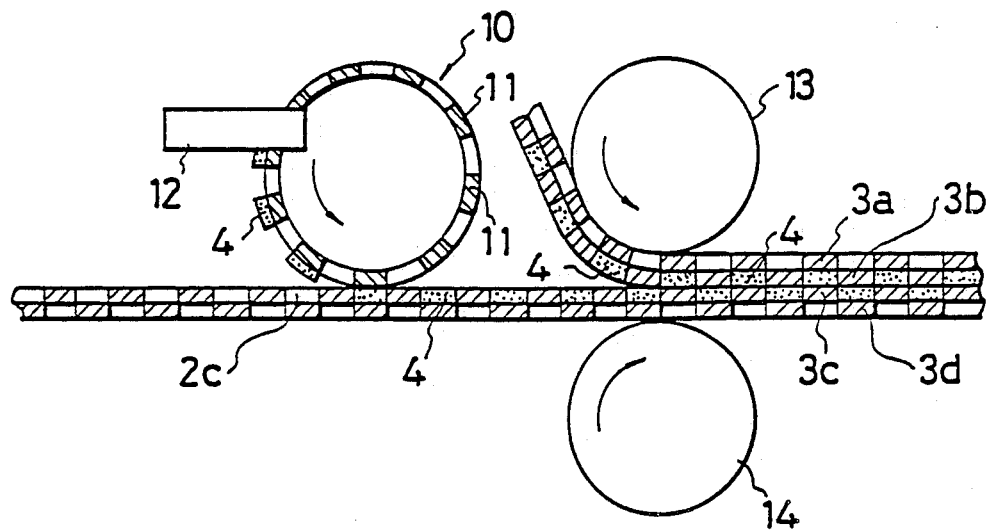

Each of FIGS. 6 to 11 comprises a plan view (A) and a cross-sectional view (B) of the laminated material and two or more plan views (C, D, etc.) of the individual films of further embodiments of the invention;

FIG. 12 is a cross-sectional view of an embodiment in which the outermost films of the laminated sheet material are non-perforated film;

FIGS. 13 to 15 are cross-sectional views in representational form illustrating the effect of including an imperforate film as the innermost element of the air bag sheet material;

FIG. 16 is a schematic view of apparatus for making the sheet material; and

Figure 17:
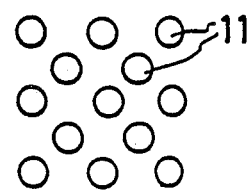

FIG. 17 is a projected diagrammatic view of an adhesive applicator roller of the apparatus of FIG. 16.

DESCRIPTION OF THE EMBODIMENT

Figure 1:
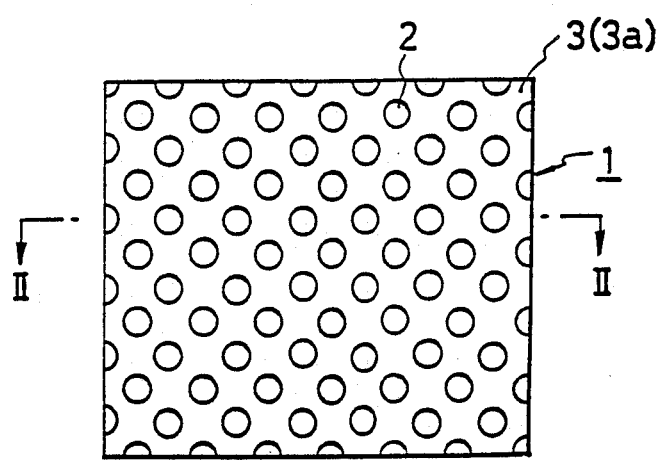
FIG. 1 is a plan view of a first embodiment.
Figure 2:
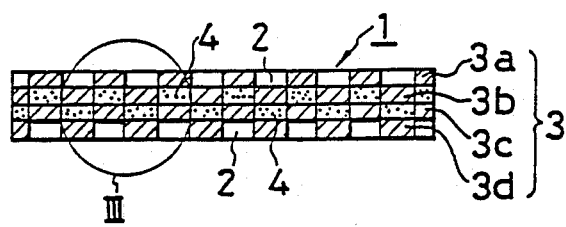
FIG. 2 is a cross-sectional view of the first embodiment, taken along the lines II—II of FIG. 1.
Figure 3:
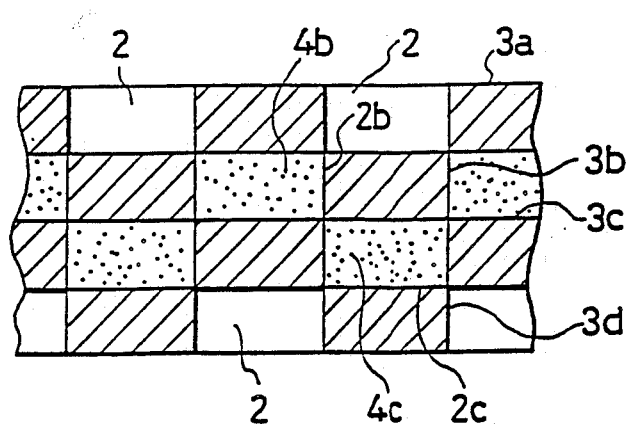
FIG. 3 is a fragmentary cross-sectional view of the first embodiment on enlarged scale, as indicated by the circle III of FIG. 2.

The embodiment of FIGS. 1 to 3, which is intended to be representative of all embodiments of the invention, is a sheet material 1 composed of several perforated polymeric films 3. Each film 3 (e.g., each of the four films 3a, 3b, 3c and 3d, FIGS. 2 and 3) has holes 2. The films 3 are placed one over the other and are joined by an adhesive to form a laminate. The holes 2 in each film 3 are arranged relative to each other, and the films 3 are positioned relative to each other, such that the holes in adjacent films do not overlap to any great extent. The adhesive 4 that joins the films 3 fills the holes 2 of all the films other than the outermost ones. If desired, the adhesive 4 may also fill the holes of the outermost films of the sheet 1. In particular, as shown in FIG. 3, adhesive 4b fills the holes 2b in the sheet 3b, and adhesive 4c fills the holes 2c in the sheet 3c. The adhesive 4b bonds the films 3a and 3c to each other, thus capturing the film 3b in a sub-laminate of films 3a, 3b and 3c. Similarly, the adhesive 4c in the holes 2c bonds the films 3b and 3d and forms a sub-laminate of films 3b, 3c and 3d.

The material of the films used in the invention is not especially limited, and transparent films such as Polyethylene Terephthalate (PET), Polyethylene (PE), Polypropylene (PP), Polystyrene (PS), and Polypropylene Sulfide (PPS) may be used. Of these materials, PET is the most desirable from the standpoint of its mechanical properties. The materials of the films of the sheet material also do not have to be the same; films of different materials may be laminated to make the air bag sheet material.

The films may be non-stretched, uniaxially stretched or biaxially stretched. It is, however, desirable to use stretched films, because they have higher tensile and rupture strengths and edge tear resistance. Also, when uniaxially and biaxially stretched films are compared to each other, it is desirable to use the biaxially stretched films in the invention, because they have better mechanical properties, other than edge tear resistance. It is advantageous to combine uniaxially and biaxially stretched films inasmuch as the former has a higher resistance to edge-tearing (a high edge tear strength). With a combination, the biaxially stretched film provides high tensile strength and the uniaxially stretched film provides edge tear resistance.

In the following paragraphs, the shape of the holes in the porous film, the open area ratio, the number of films and other characteristics for the sheet material of the invention are described.

SHAPE OF HOLE

Figure 4:
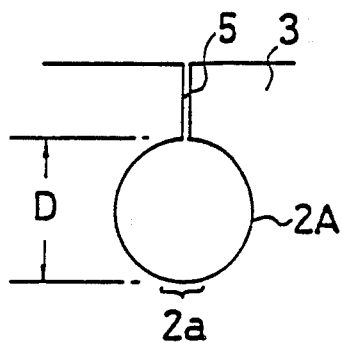
FIG. 4 is a diagrammatic plan view of one form of hole in a perforated film for the sheet material.
Figure 5:
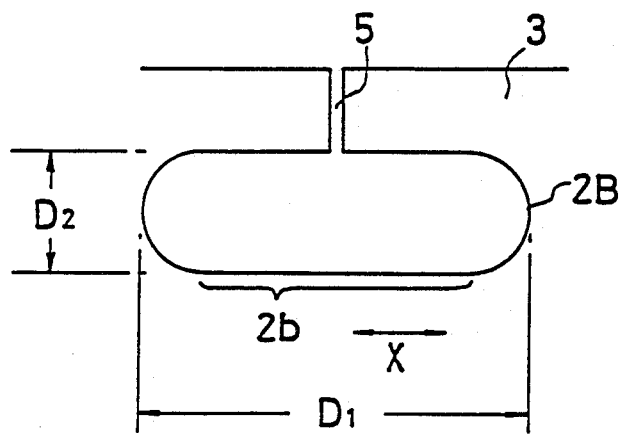
FIG. 5 is a diagrammatic plan view of another form of hole in a film of the sheet material.

There are no special limitations on the shapes of the holes, except that it is important that the holes have entirely curved edges, such as circles, ovals, or ellipses, and have no corners or angles. In order to provide uniformity or balancing of resistance to edge tearing, a circular hole 2A is desirable, as the stress will be uniformly distributed, as shown in FIG. 4. But even with holes of oval shape or oblong holes 2B with straight parallel side edges and semi-circular end edges, as shown in FIG. 5, good results may be obtained in some cases. To be specific, with the holes 2B of FIG. 5, the resistance to edge tearing at the edge of the holes from the crack 5 is almost equal to the edge tear strength on the straight line 2b, and the resistance to edge tearing is extremely high. By orienting the stretch axis X of the film parallel to the straight edges 2b of the holes 2B, the against tearing can be improved. An overall balance of strength against edge tearing at the edges of the holes can be attained by using films in which half the holes are oriented with their longer axes perpendicular to the axes of the remaining holes. Also, films with all of their holes oriented in the same direction can be laminated so that half the films have their holes oriented perpendicular to the holes of the other half of the films.

It is not necessary for all of the holes in a film of the sheet material to be of the same shape, nor is it necessary for all films of the sheet to have holes of the same shape. The shapes of the holes can vary within each film or among the films of the sheet material.

SIZE OF HOLE

In the case of a circular hole 2A, as shown in FIG. 4, the arc approximates a straight line and the edge tear strength approaches the edge tear strength at the point 2a opposite a tear or crack 5 as the hole diameter D gets larger. If the hole diameter is excessively large, however, the tensile strength and the resistance to tearing of the film as a whole becomes smaller. It is, therefore, desirable to have a hole diameter D of about 10 to 20 mm. In the case of the oblong hole 2B shown in FIG. 5, a longer dimension D1 of about 10 to 20 mm and a shorter dimension D2 of about 5 to 10 mm are desirable. The holes in each film, and the holes in the several films of the sheet material, need not be of the same size, and large and small holes may be combined in each film or in the several films.

OPEN AREA RATIO

A higher open area ratio will result in reduced tensile and rupture strength. Such strength may be regained to some extent by laminating and adhering films in various ways, but it will be difficult to compensate by so doing if the open area ratio is extremely large. Less than 50% of open area, normally 25% to 45% of open area, is desirable. (The percentages are expressed as the percentage of the total area of the film that the holes take up, i.e., the area of the holes divided by the total area of the film times 100).

HOLE PITCH

The hole pitch is a function of the hole size and shape and the desired open area. Normally, a hole pitch of 10 to 30 mm is desirable.

HOLE ARRANGEMENT

There are no special limitations on hole arrangement. Various arrangements, including irregular and regular, may be adopted.

FILM THICKNESS

Film thickness is determined with a view to the ease of folding the material when it is made into an air bag. It is, therefore, dependent as a rule on the bending strength (or bending elasticity) of the film. A film of higher bending strength may be made thinner to achieve higher flexibility and foldability. On the other hand, a film of low bending strength may be made thicker, but the film thickness should be less than 50 micrometers normally. When using PET as the film material, the film should be less than 25 micrometers thick, as PET has a very high bending strength. If it is made thicker than that, it will have a high resistance to being folded. In case of PET film, a thickness of 12 to 25 micrometer is desirable.

NUMBER OF FILMS IN THE SHEET MATERIAL

The number of films in the sheet material is determined according to hole arrangement, open area, and film thickness. It is, however, desirable to limit the thickness of the laminated sheet to less than 300 micrometers, because the advantages of making the air bag thinner may not be obtained if the sheet is too thick. A sufficient strength may not be obtained if the number of films is small and the sheet is not thick enough. Therefore, the number of films should be determined so that the sheet will be about 250 to 300 micrometers thick.

In FIGS. 6 to 11, the films are designated by the numeral 3 followed by a letter and a number that relate the particular film, as shown in one of the plan views of the films (Figs. C, D, E, etc.), to the cross-sectional view. Films identified by the same letter are the same, and the numeral in that case designates a different position of the film in the laminated sheet — i.e., the registration of the film. A capital roman numeral and an arabic numeral designate edges of the films that register in the laminated sheet material. For clarity, the adhesive in the holes of the films is not shown, but it is apparent that the unshaded areas in Figs. B contain adhesive. As mentioned above, the holes of the outermost films of the laminated sheets need not be filled with adhesive.

In the embodiment shown in FIG. 6, the films 3C have the relatively small circular holes 2C (for instance, diameter: 10 to 12 mm, open area: 39.3%) arranged in a zig-zag or staggered fashion and are laminated so that the holes in adjacent layers do not overlap. In other words, the film $3C_1$ of the hole arrangement as shown in FIG. 6C and the films $3C_2$ as shown in FIG. 6D are laminated in the order of $3C_1$, $3C_2$, $3C_1$, $3C_2$, $3C_1$, $3C_2$, $3C_1$... (ten films in this embodiment) so that the edge $I_1$ registers with the edge $I_2$ and the edge $II_1$ registers with $II_2$ In the embodiment shown in FIG. 7, films 3D with relatively large circular holes 2D (for instance, diameter: 18 to 20 mm, open area: 39.3%) arranged in staggered relation are laminated so that the holes in the fifth film will be on the same position as those on the first film. In other words, the films $3D_1$ through $3D_4$, as shown in FIGS. 7C through 7F, are laminated in the order of $3D_1$, $3D_2$, $3D_3$, $3D_4$, $3D_1$, $3D_2$, $3D_3$, $3D_4$... (12 films in this embodiment) and so that the edges $III_1$, $III_2$, $III_3$, and $III_4$ register and the edges $IV_1$, $IV_2$, $IV_3$, and $IV_4$ register.

Figure 8A:
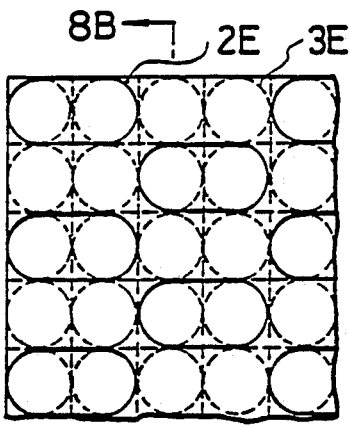
Figure 8B:
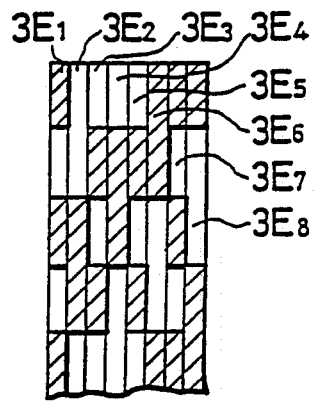
Figure 8C:
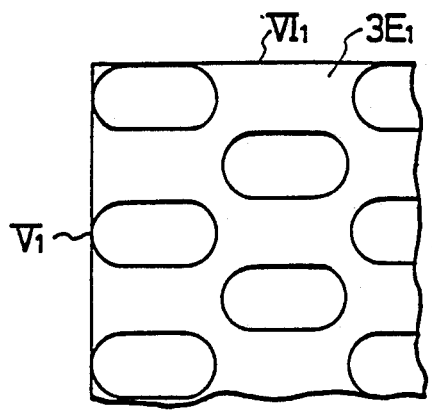
Figure 8D:
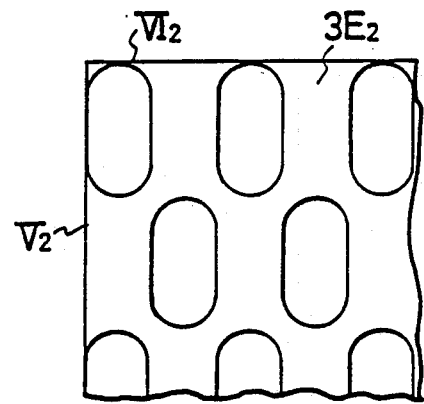
Figure 8E:
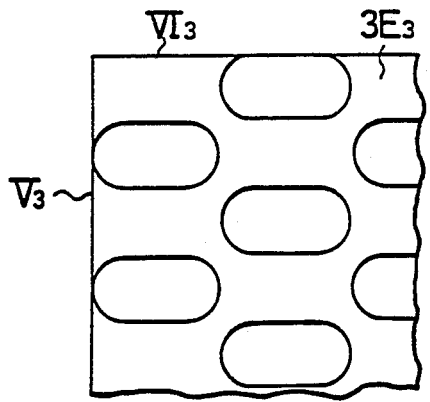
Figure 8F:
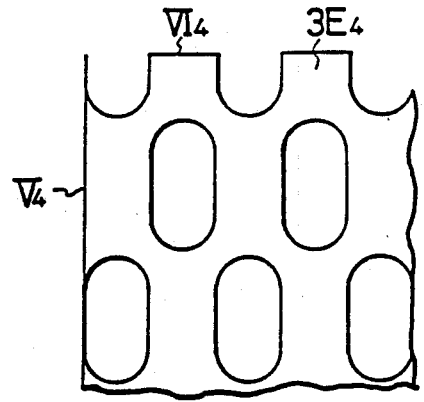
Figure 8G:
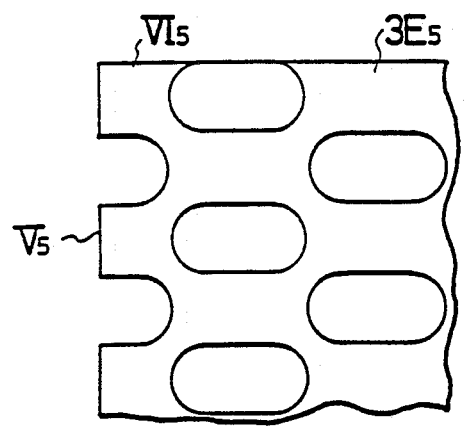
Figure 8H:
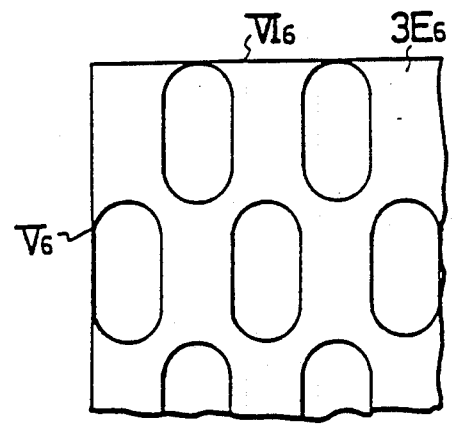
Figure 8:
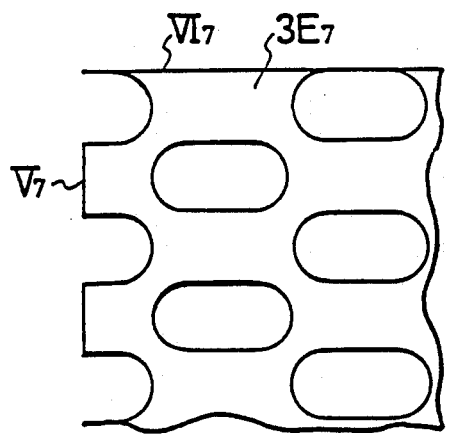
Figure 8J:
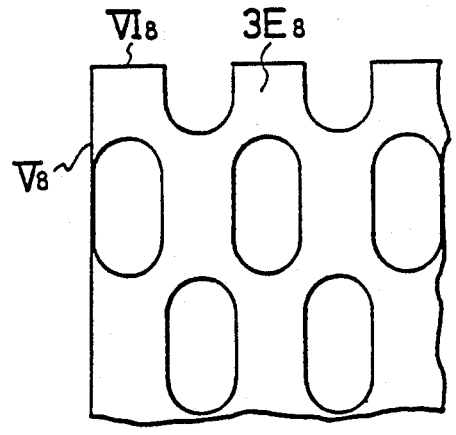

In the embodiment shown in FIG. 8, films 3E with oblong holes 2E arranged in staggered relation (with an open area of 44.6%, for instance) are laminated with the holes oriented in alternate directions so that the long dimensions of the holes in adjacent films are perpendicular to each other. Thus, eight films $3E_1$ through $3E_8$ with the hole arrangements as shown in FIGS. 8C through 8J are laminated in the order of $3E_1$, $3E_2$, $3E_3$, $3E_4$, $3E_5$, $3E_6$, $3E_7$, and $3E_8$ so that the edges $V_1$, $V_2$, $V_3$, $V_4$, $V_5$, $V_6$, $V_7$, and $V_8$ register and the edges $VI_1$, $VI_2$, $VI_3$, $VI_4$, $VI_5$, $VI_6$, $VI_7$, and $VI_8$ register.

Figure 9A:
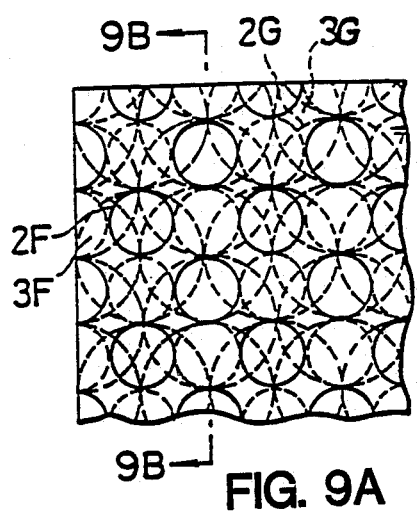
Figure 9B:
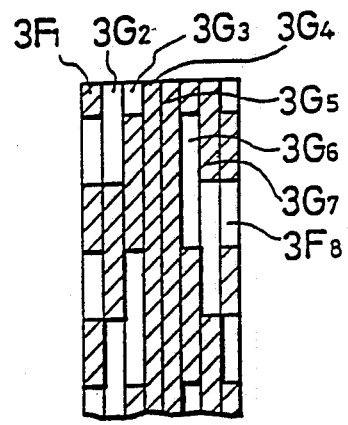
Figure 9C:
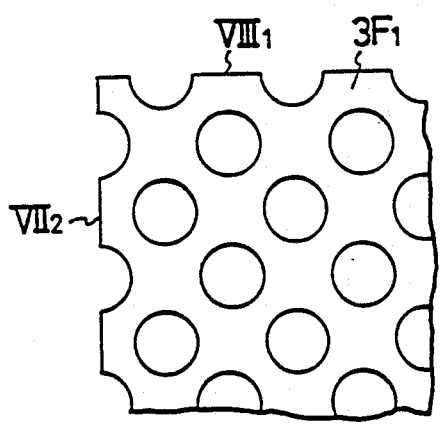
Figure 9D:
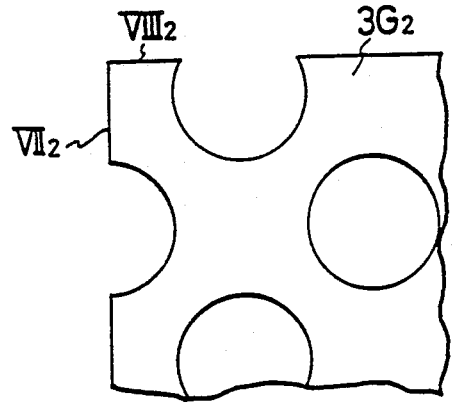
Figure 9E:
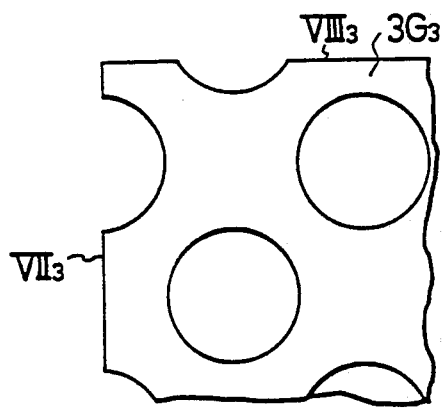
Figure 9F:
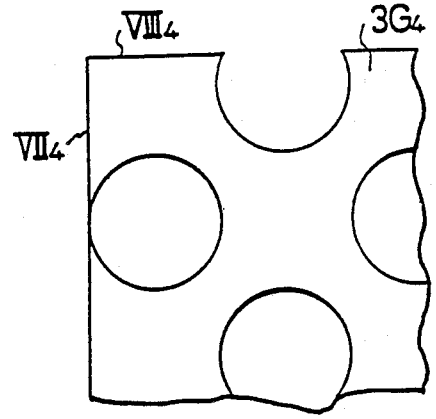
Figure 9G:
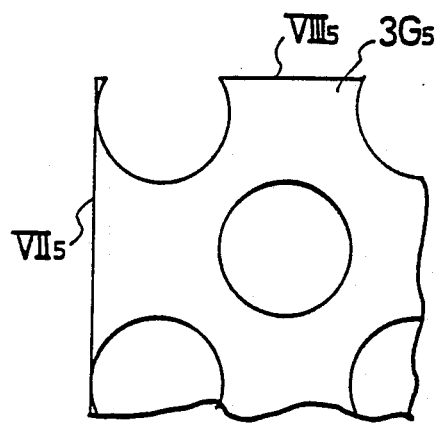
Figure 9H:
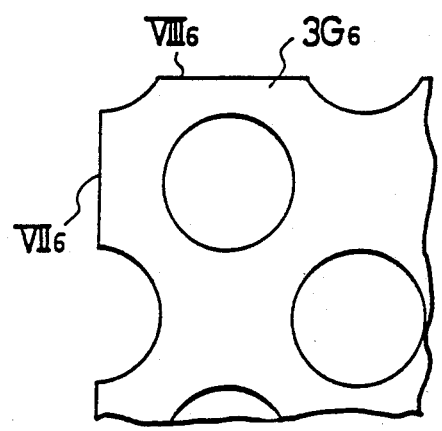
Figure 9:
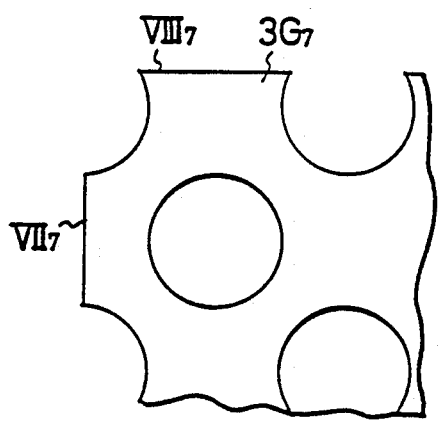
Figure 9J:
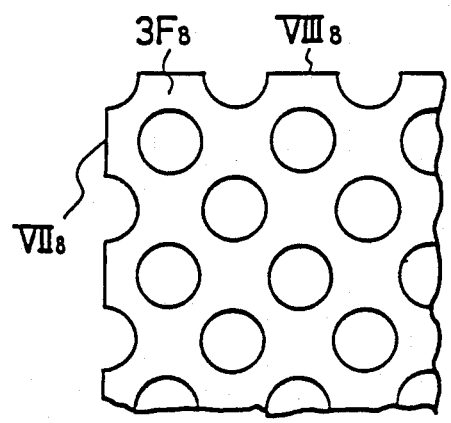

In the embodiment shown in FIG. 9, films 3F with small circular holes 2G and films 3G with large circular holes 2G are combined in the order of $3F_1$, $3G_2$, $3G_3$, $3G_4$, $3G_5$, $3G_6$, $3G_7$ and $3F_8$ so that the edges $VII_1$, $VII_2$, $VII_3$, $VII_4$, $VII_5$, $VII_6$, $VII_7$, and $VII_8$ register and the edges $VIII_1$, $VIII_2$, $VIII_3$, $VIII_4$, $VIII_5$, $VIII_6$, $VIII_7$, and $VIII_8$ register.

Figure 10A:
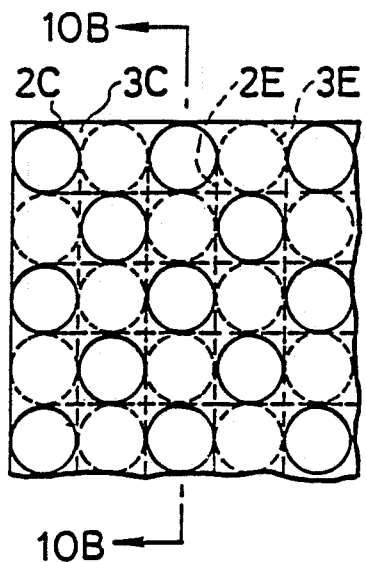
Figure 10B:
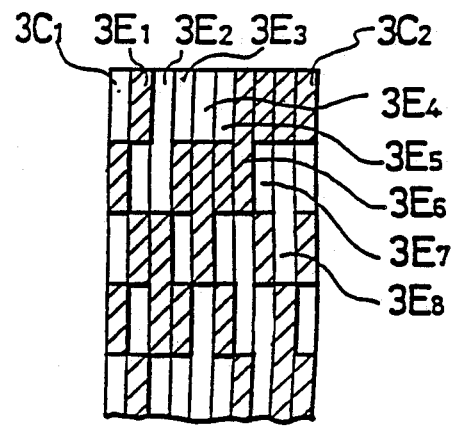
Figure 11A:
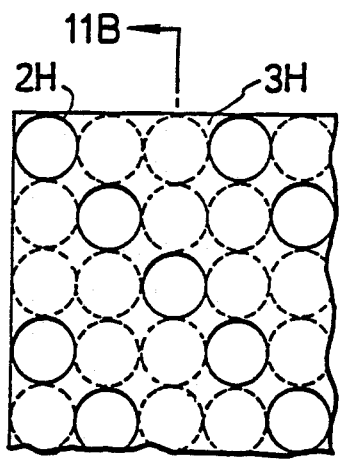
Figure 11B:
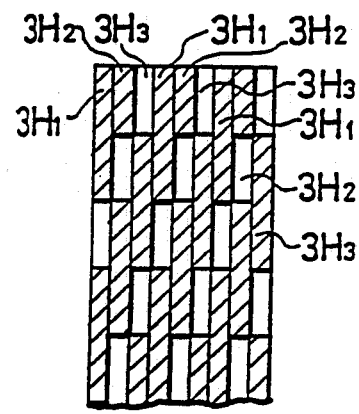
Figure 11C:
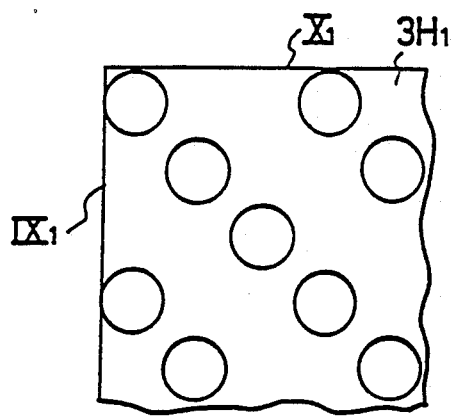
Figure 11D:
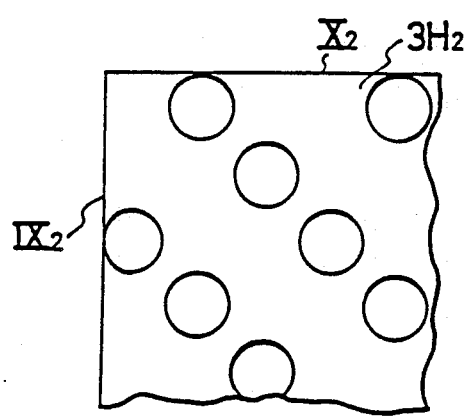
Figure 11E:
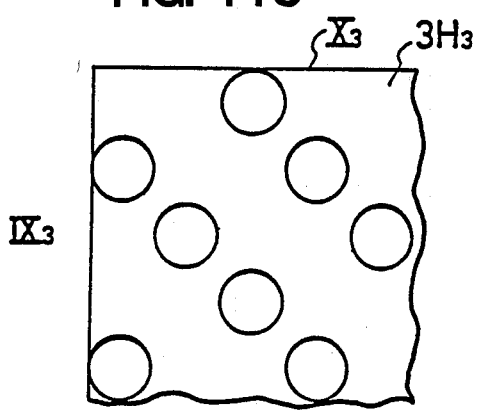

In the embodiment shown in FIG. 10, films 3C with small circular holes 2C, the same films as used in the embodiment shown in FIG. 6, and the films 3E with the oblong holes 2E used in the embodiment shown in FIG. 8 are laminated in the order of $3C_1$, $3E_1$, $3E_2$, $3E_3$, $3E_4$, $3E_5$, $3E_6$, $3E_7$, $3E_8$, and $3C_2$ (ten films) so that the eges $I_1$, $V_1$, $V_2$, $V_3$, $V_4$, $V_5$, $V_6$, $V_7$, $V_8$, and $I_1$ register and the edges $II_1$, $VI_1$, $VI_2$, $VI_3$, $VI_4$, $VI_5$, $VI_6$, $VI_7$, $VI_8$, and $II_2$ register.

In the embodiment of FIG. 11, films 3H with small circular holes 2H arranged at relatively large pitch distances and with a low open area percentage (about 26.2%, for instance) are laminated in the order of $3H_1$, $3H_2$, $3H_3$, $3H_1$, $3H_2$, $3H_3$... (nine films) so that the edges $IX_1$, $IX_2$, and $IX_3$ register and the edges $X_1$, $X_2$, and $X_3$ register.

The adhesive used to adhere the perforated polymeric films is required to be flexible and transparent and to have a high strength, especially against peeling and delamination, and to have a high heat resistance characteristic (over 125° C.). Therefore, an adhesive will be selected taking into consideration such factors as the adhesion properties in relation to the polymeric film to be used. For PET film, for instance, synthetic resins of nitrile rubber, polyester, cyanoacrylate, acrylate, epoxy, polyolefin, urethane rubber and neoprenephenolic are desirable. Of these, adhesives of urethan rubber, epoxy, polyester and nitrile rubber are especially desirable. In addition, adhesives of silicon rubber are desirable, as they are excellent in flexibility and heat-resistance properties, though their adhesion strength is limited.

The adhesive fills the holes in the films, and the films are adhered to each other so that the holes are positioned without overlapping of the holes in adjacent films to any great extent. For example, in FIGS. 1, 2, and 3, the film 3b is adhered to the films 3a and 3c with the adhesive 4b that fills the holes 2b in the film 3b. Also, the film 3c is adhered to the films 3b and 3d with the adhesive 4c that fills the holes 2c in the film 3c. It is, therefore, not necessary to fill the holes on the outermost films of the laminated sheet (the films 3a and 3d in the example shown in FIG. 3) with an adhesive, but it is possible, on the other hand, to fill the adhesive in the holes on the outermost films. In this way, by filling the adhesive in the holes on the porous plastic films and thus by not forming adhesive layers between the films, almost no thickness of adhesive is added to the laminated sheet, making the thickness of the laminated sheet approximately the same as the total of the thicknesses of the films. This results in the air bag sheet material being thin and strong. By filling the holes with the adhesive, the flexibility of the sheet material is also improved.

The holes in the polymeric films may be positioned in the air bag material in partially overlapped relation, but the holes in the films have to be positioned, of course, so that there will be no holes completely through the sheet material.

At least one of the two outermost films of the sheet material may be non-perforated. In FIG. 12, a sheet material 1A is made by laminating non-perforted films 6a and 6b on each side of the perforated plastic films 3a, 3b, 3c and 3d. The non-perforated films 6a and 6b improve the tensile and rupture strength of sheet material. As shown in FIG. 13, for example, if an air bag is made of an air bag sheet material 1B which is made by laminating and adhering with the adhesive 4 perforated films 3a, 3b and 3c, the part W on the film 3b located between the holes 2a and 2b of the films 3a and 3c will support the internal pressure of the air bag only with the strength of a single film, and in some extreme cases, the part W may distend and be ruptured (FIG. 14). In case of the sheet material 1C in which the internal surface of the air bag material is covered with a non-perforated film 6 (FIG. 15), no internal pressure will be directly applied onto the part W on the film 3b, and the pressure will be distributed over the entire surface of the non-perforated film 6, thus preventing local rupture.

It is, therefore, desirable to provide a non-perforated film at least on the internal surface of the air bag. If a non-perforated film is also provided on the external surface of the air bag, in addition to distributing the internal pressure, contact of the adhesive with the air (oxygen) and deterioration of the adhesive over time will be prevented, thus to improve the durability of the air bag.

There are no special limitations on the thickness of the non-perforated film, and the thickness will be determined within the parameters suitable to the air bag sheet material stated above, with attention to such factors as strength. Generally, the thickness of non-perforated films may be 12 to 25 micrometers. The non-perforated film may be of the same material as the porous perforated polymeric films of the sheet.

In accordance with the invention, a laminated sheet of eight to ten PET films of 12 to 25 micrometers thickness with an open area of about 25% to 45% and the holes arranged as shown in FIGS. 6, 8 and 10, and of a PET non-porous film of 12 to 25 micrometers thick on at least the inner side is most desirable for an air bag.

Next, the manner of producing the air bag sheet material of the invention is described.

When producing the air bag sheet material shown in FIGS. 1 through 3, for instance, two perforated polymeric films 3c and 3d are positioned in proper register with each other, as shown in FIG. 16. Adhesive 4 is transferred into the holes 2c on the film 3c by applying the adhesive onto projections 11 of a roller 10 from an adhesive container 12. The roller 10 is provided with circular projections 11 arranged in the same pattern as the holes 26 in the film 3c, as shown in FIG. 17. The laminated sheet of the films 3b and 3a, to which the adhesive 4 is transferred in the same manner, is placed on the films 3c and 3d, and pressure is applied using the rollers 13 and 14. By placing the four films thus obtained on top of another four films combined in the same manner, a laminated sheet of eight films will be obtained. A non-perforated film can be combined with several perforated films by depositing adhesive in the holes of the outermost perforated film and feeding the perforated films and the non-perforated films through rollers.

An air bag can be produced extremely easily from the air bag sheet material by vacuum-forming two members of the sheet material to provide two generally hemispherical parts of the air bag and joining them together along their perimeters by fusion-welding, such as by ultraviolet light irradiation fusion-welding. An air bag need not be made entirely of the sheet material of the present invention, but can have its base portion (the portion adjacent the gas generator, to which the air bag is attached) made of conventional coated cloth.

The holes in the polymeric films impart a high resistance to rupture of the material by tearing. The films have high tensile, rupture and edge tearing strengths. By laminating the perforated films so that the holes do not substantially overlap and by adhering the films with the adhesive filling in the holes, the strength of the laminated sheet can be considerably improved without excessively increasing its thickness. A non-perforated film on one or both surfaces of the laminated sheet further enhances the mechanical strength and durability of the sheet material. It is, therefore, possible to make an air bag that is thinner, and the volume and weight of the air bag in folded condition will be significantly less than those of conventional air bags. Moreover, as polymeric films can be easily shaped by vacuum-forming and joined by fusion-welding, the production process for making the air bag can be considerably simplified. Also, the air bag can be made transparent to expand the field of vision of the driver.

Set forth below in Table 1 are the results of measurements and evaluations of the characteristics of several examples of polymeric films, a laminated sheet material of the invention, a conventional air bag sheet material, and a laminate not according to the invention, as follows:

Examples of Reference 1 and 2, Example of Embodiment 1, and Examples of Comparison 1 through 5.

Figure 6A:
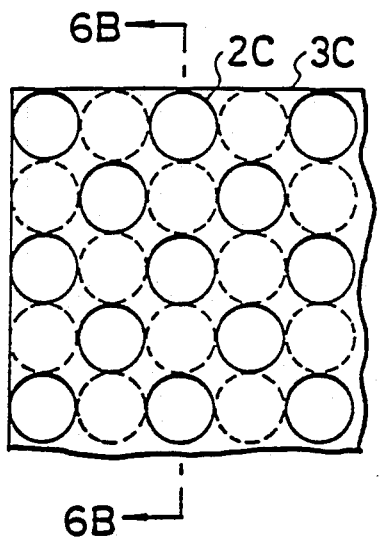
Figure 6B:
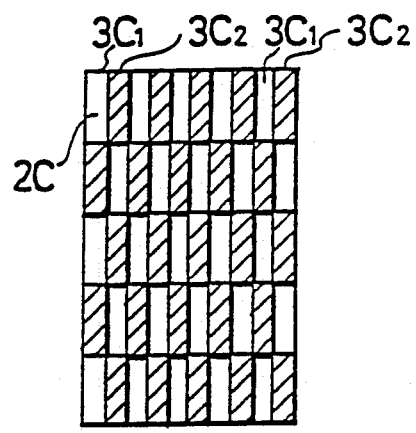
Figure 6C:
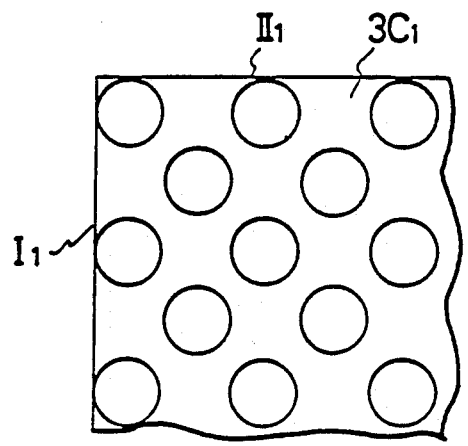
Figure 6D:
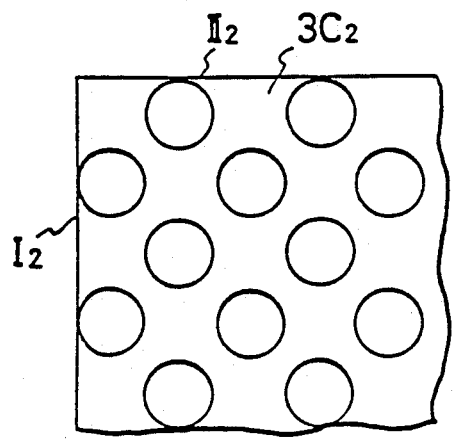
Figure 7A:
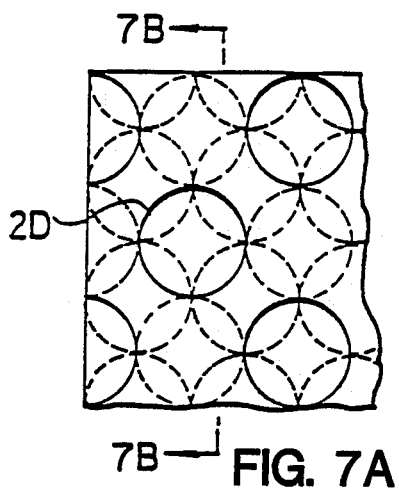
Figure 7B:
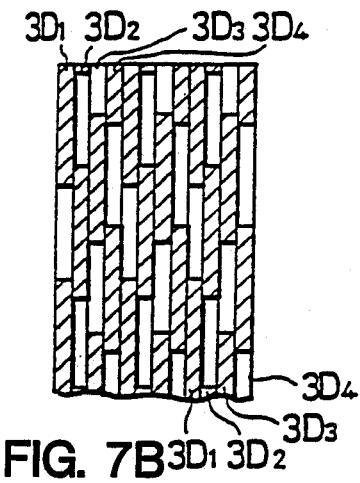
Figure 7C:
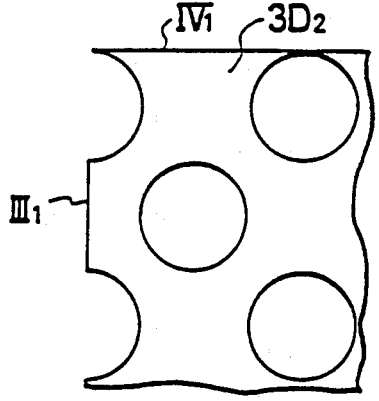
Figure 7D:
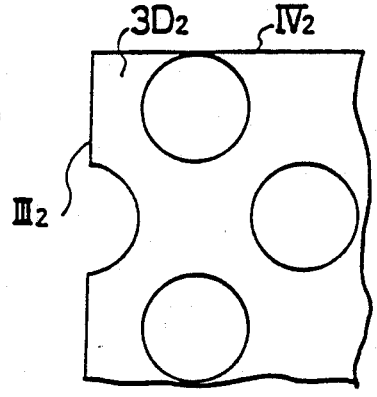
Figure 7E:
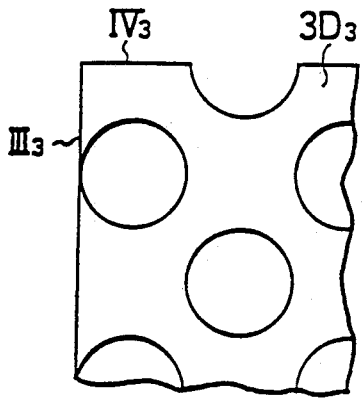
Figure 7F:
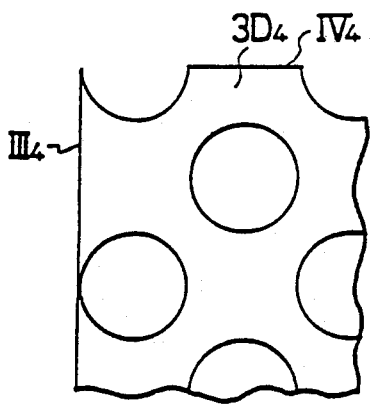

Reference Example 1: Perforated Film
Material: PET biaxially stretched film
Thickness: 25 micrometer
Hole Shape: Circular
Hole Diameter: 10 mm
Open Area Ratio: 39.3%
Hole Arrangement: FIGS. 6A and 6B
Reference Example 2: Perforated Film
Material: PET biaxially stretched film
Thickness: 25 micrometer
Hole Shape: Circular
Hole Diameter: 10 mm
Open Area Ratio: 39.3%
Hole Arrangement: FIGS. 6A and 6B

EMBODIMENT EXAMPLE 1L

Perforated Film Laminated Sheet Material

Perforated Film: That of Reference Example 1
Number of Films Laminated: 12 films
Total Thickness: 320 micrometer
Adhesive: Epoxy
Comparison Example 1: Conventional Air Bag Fabric
Material: 840d-Cr. coated cloth (Cr-coated nylon 66)
Thickness: 400 micrometer
Comparison Example 2: Non-perforated film
Material: Polyethylene non-stretched film
Thickness: 25 micrometer
Comparison Example 3: Non-perforated film
Material: PET non-stretched film
Thickness: 25 micrometer
Comparison Example 4: Non-perforated film
Material: PET biaxially stretched film
Thickness: 25 micrometer
Comparison Example 5: Non-perforated film laminated Sheet
Two polyethylene uniaxially stretched films laminated so that the stretch axes are mutually perpendicular Thickness: 37 micrometer The measurement techniques were as follows:

a. Tensile Strength (kgf/cm)

Using a constant speed tensile testing machine and with the testing machine holder distance being about 100 mm, the test sample was attached to the holders and pulled at a rate of about 200 mm per minute. The tensile load at rupture was measured. In Comparison Example 1 only, a holding distance of 76.2 mm and a pulling rate of 300+20 mm/min were used.

b. Rupture Strength (kg/cm$^2$)

Using a Mullen rupture testing machine, and applying a pressure up to 80 kgf/cm$^2$ in 3 to 5 seconds, the pressure at rupture was recorded in kgf/cm$^2$ c. Tear Resistance (kgf)

With the tensile rate of 100 mm/min., the load when tearing occurred was recorded on the chart (50 mm/min.), and the average value of peak loads at tearing was taken as the tear resistance.

d. Edge Tear Strength (kgf/20 mm)

Using a V-grooved steel sheet, the film was folded so that its surface was in contact with the V-groove, the sheet was pulled at the rate of about 200 mm/min. The average and lowest values of the force when tearing occurred were measured.

TABLE 1

|  | Reference Example | | Embodiment | Comparison Example | | | | |
| --- | --- | --- | --- | --- | --- | --- | --- | --- |
| Example | 1 | 2 | 1 | 1 | 2 | 3 | 4 | 5 |
| Sample Thickness (micrometers) | 25 | 25 | 320 | 400 | 25 | 25 | 25 | 100 |
| Tensile strength (kgf/cm) | 3.5–4.0 | 3.5–4.0 | 60 | 58.3 | 0.75–1.13 | 1.5–2.5 | 6.3–7.0 | 6.0 |
| Rupture strength (kg/cm$^2$) | 4.2 | 4.2 | 76 | 74.7 | 0.5–0.635 | — | 6.0 | 4.0 |
| Tear Resistance* (kgf) | 1.2–2.0 | 3.67–8.67 | 28 | 30–33 | 0.02–0.75 | 0.005–0.013 | 0.02 | 4.5 |
| Edge Tear strength (kgf/20 mm) | 22 | 22 | — | — | — | — | 22 | 6.6 |
| Melting Temperature (°C.) (Approx.) | 270 | 270 | 270 | 260 | 170 | 270 | 270 | 170 |

*Reference Example 2 was by the Travezoid Method, Comparison Examples 2, 3 and 4, the Elemendorf Method and the others the Tong Method.
In the Table, "—" indicates not tested.

As is clear from the data in Table 1, the perforated films used in the invention (Reference Examples 1 and 2) have excellent mechanical strength properties, and their tear resistance is considerably higher when compared with the non-perforated films (Comparison Examples 2 through 4). By laminating such perforated films as in Embodiment Example 1, therefore, a sheet material which is thinner than the conventional coated fabric material (Comparison Example 1) and which has satisfactory properties is obtained.

The air bag sheet material of the invention has a very good tear resistance in addition to the good tensile, rupture and edge tear strengths. As a result, even relatively thin sheet material has excellent mechanical strength. It is possible to improve strength by increasing the number of films in the laminated sheet material without excessively increasing the total thickness.

It is advantageous in order to further improve the mechanical strength of the sheet, and also its durability, to include a non-perforated film on one or both outer surfaces of the sheet material.

An air bag made of the air bag sheet material of the invention has the following advantages:

a. it is possible to make the air bag thinner, decrease the volume of the air bag when folded, and to reduce the weight.

b. It is possible to simplify the production process and thus to reduce the production costs.

c. When the air bag is deployed, it will not block the field of view ahead of the driver, as it can be made transparent.

I claim:

1. Sheet material for use in vehicle safety air bags comprising a multiplicity of perforated films of polymeric material having holes, the holes in the films being free of corners and the perforated films being superposed directly on each other and aligned such that the holes in adjacent films do not entirely overlap, and adhesive filling the holes of all of the perforated films other than the outermost one and uniting them into a laminate.

2. Sheet material according to claim 1 and further comprising a non-perforated film adhered to an outermost perforated film and an adhesive filling the holes of said outermost film to unite the non-perforated film to the laminate.

3. Sheet material according to claim 1 wherein the holes in the perforated films have curved edges throughout.

4. Sheet material according to claim 1 wherein the maximum dimension of the holes in any direction is about 20 mm.

5. Sheet material according to claim 1 wherein the minimum dimension of the holes in any direction is about 5 mm.

6. Sheet material according to claim 1 wherein the total area of the holes in each perforated film does not exceed about 50% of the total area of the film.

7. Sheet material according to claim 6 wherein the total area of the holes in each perforated film is from about 25% to about 45% of the total area of the film.

8. Sheet material according to claim 1 wherein the total thickness of the sheet material does not exceed about 300 micrometers.

9. Sheet material according to claim 8 wherein the total thickness of the sheet material is in the range of from about 250 micrometers to about 300 micrometers.

* * * * *